United States Patent [19]
Onaka et al.

[11] Patent Number: 5,886,804
[45] Date of Patent: Mar. 23, 1999

[54] OPTICAL TRANSMISSION SYSTEM EMPLOYING SINGLE MODE OPTICAL TRANSMISSION FIBER

[75] Inventors: Hiroshi Onaka; Hideyuki Miyata; Kazue Otsuka, all of Kawasaki, Japan

[73] Assignee: Fujitsu Limited, Kanagawa, Japan

[21] Appl. No.: 627,722

[22] Filed: Apr. 1, 1996

[30] Foreign Application Priority Data

Mar. 31, 1995 [JP] Japan .................................. 7-075787

[51] Int. Cl.⁶ .................................................. H04B 10/00
[52] U.S. Cl. ............................ 359/161; 359/124; 359/173
[58] Field of Search .................................... 359/188, 173, 359/161, 125, 124, 179, 182–183; 385/115, 124; 372/21, 70, 69

[56] References Cited

U.S. PATENT DOCUMENTS

| | | | |
|---|---|---|---|
| 5,243,610 | 9/1993 | Murata | 372/21 |
| 5,303,079 | 4/1994 | Gnauck et al. | 359/125 |
| 5,559,920 | 9/1996 | Chraplyvy et al. | 385/123 |
| 5,636,046 | 6/1997 | Ishikawa et al. | 359/161 |
| 5,663,823 | 9/1997 | Suzuki | 359/181 |

*Primary Examiner*—Kinfe-Michael Negash
*Attorney, Agent, or Firm*—Helfgott & Karas, P.C.

[57] ABSTRACT

In an optical transmission system for intensively modulating an optical wavelength with a sending signal to be transmitted and optically amplifying a modulated optical signal, a wavelength dispersion characteristic of a single mode optical transmission line can be suitably compensated. The optical transmission system comprises a modulating circuit for modulating optical phases or frequencies of the optical wavelength with the sending signal to set a chirping parameter α to −0.65 to −1.3, and outputting an modulated signal; an optical transmission line having wavelength residual dispersion value of 16 to 21 ps/nm/Km for transmitting the modulated signal; and a dispersion compensating circuit for compensating wavelength dispersion value, of the optical transmission line, which is set to approximately +500 to +1200 ps/nm when an input optical power is more than −5 dBm.

20 Claims, 13 Drawing Sheets

OPTICAL TRANSMISSION SYSTEM EMPLOYING SINGLE MODE OPTICAL TRANSMISSION FIBER

BACKGROUND OF THE INVENTION

1. Field of the Invention

The present invention relates to an optical transmission fiber system. More particularly, it relates to an optical transmission system for optimally compensating a wavelength dispersion characteristic of a single mode optical transmission fiber.

2. Description of the Related Art

High-capacity transmission systems are strongly expected in future multi media network. Several schemes have been proposed to realize a super high capacity optical transmission system, for example, Time-Division Multiplexing (TDM) system, an Optical Time-Division Multiplexing (OTDM) system, which is used in optical areas, and a wavelength-Division-Multiplexing (WDM) system.

An Erbium Doped Fiber amplifier (EDFA) having a wide gain band in the 1.5 μm band has been put to practical use as a pre-amplifier, a post amplifier, or a repeater amplifier. The WDM system among the above-described various kinds of systems is more useful as a system for obtaining a flexible optical wave network, in which cross-connecting, branching, inserting optical signals, and multiplexing different kinds of services are performed.

Further, the WDM system is more preferable to other systems in the case where a network constructed by using a 1.3 μm zero-dispersion single mode fiber, which is called as SMF, is employed as high-capacity repeaterless transmission system. This is because that as the transmission speed per optical carrier signal is lowered, it maybe possible to make acceptable values large, of wavelength dispersion and input optical power which is limited due to nonlinear effect of an optical fiber.

However, transmission speed and distance are limited because a transmission waveform is distorted due to a wavelength dispersion characteristic or interaction of the characteristic and nonlinear effect, in the case where an optical signal having a high speed more than 10 Gb/s per carrier wave is transmitted.

The wavelength dispersion characteristic means a characteristic, in which speed is changed for each wavelength according to a refractive index having wavelength dependency. Therefore, a delay amount becomes different per carrier wavelength, and then waveform distortion is generated.

It is general to use a system for inserting a dispersion compensating device having dispersion, of which symbol is reversed to that of transmission fiber dispersion generated in a transmission fiber, and offsetting the transmission fiber dispersion as a system for suppressing the wavelength dispersion. Several systems, for example (1) a system employing a grating technique, (2) a system employing an optical interferometer, or (3) a system employing an optical fiber have been already proposed, as dispersion compensating device.

Further, a system for performing pre-chirping in a transmitter, that is, a system for intentionally modulating phases or frequencies to suppress dispersion modulating phases or frequencies to suppress dispersion due to wavelength dispersion other than intensity signal components which is modulated with a base band signal, or a system for shaping waveform by a pulse compression effect according to nonlinear effect in SMF, has been proposed.

A dispersion compensating fiber (DCF) is most attractive among various kinds of dispersion compensating devices from the view point of controlling operation in a wide band and dispersion, and stability.

FIG. 1 shows a structural example of a general wavelength division multiplexing (WDM) transmission system having a plurality of repeaters, which employs a SMF transmission line.

A system shown in FIG. 1 performs wavelength division multiplexing transmission under the condition of 3 repeaters, 16-carriers×4=280 Km.

Further, in FIG. 1, there are 16 pieces of laser diodes 1 (LD) corresponding to 16 carriers.

A Lithium Niobate (LiNbO$_3$) external modulator, which is so-called as LN, emits different carrier wavelengths, each modulated corresponding to a signal.

An optical coupler 3 receives optical outputs of the emission spectrums, each of 16 different wavelengths respectively sent from the 16 pieces of laser diodes (LD) 1, combines and outputs them. A branch circuit 4 having a branching ratio of 10:1 branches and outputs ¹⁄₁₀ of the combined signals outputted from optical coupler 3 and inputs it to a wavelength stabilizer 5.

The wavelength stabilizer 5 feeds a control signal back to a driver circuit of each of laser diodes (LD) 1 so as to set carrier wavelength signal to a predetermined wavelength.

Further, in the above-described external modulator 2 and the optical coupler 3, attenuation is generated. Accordingly, a post amplifier 6 is provided to amplitude an emitted level to the original level. The post amplifier 6 is formed of the above-described Elbium Doped Optical Fiber.

A reference numeral 7, for example, it is 1.3 μm zero-dispersion single mode fiber, that is SMF, has a length of about 70 Km.

A branch circuit 9 receives the optical signal sent from the optical transmission line, and the optical signal branched by the branch circuit 9 is inputted to an optical to electrical convertor 12 via a band pass filter 11 having a central wavelength of 0.3 nm to covert it to a corresponding electrical signal.

In FIG. 1, a dispersion compensating circuit 8 is inserted on the way of the optical transmission line. Dispersion compensating circuit 8 is formed of a dispersion compensating fiber (DCF) 80, a pre-amplifier 81 and a post amplifier 82.

In FIG. 1, when one wavelength is transmitted, only one laser diode (LD) 1 may be employed and no optical coupler and optical selective filter are necessary.

Further, dispersion compensating fiber (DCF) 80 has a larger dispersion absolute value, and symbols of the value are reversed to the distributed value of SMF 7 to give dispersion compensation.

Dispersion compensating fiber (DCF) 80 is employed to give dispersion compensation. However, a core size of the fiber 80 is substantially small, and a nonlinear refractive index is large. That brings great nonlinear effect in comparison with that of a normal SMF or a dispersion shifted fiber.

In this case, nonlinear effect that appears extreme is self phase modulation (SPM) when a signal source outputs one wave carrier for TDM and OTDM, while it is cross phase modulation (XPM) as well as self phase modulation (SPM) when the signal source outputs multi-wave carriers.

In either cases, wavelength chirping is generated on the optical signals, and transmission waveforms are distorted resulting in deterioration of the transmission characteristic. It is the easiest way for reducing the nonlinear effect in dispersion compensating fiber (DCF) 80 to make input power of the DCF 80 lowered.

However, if the input power of DCF 80 is lowered, SN ratio becomes worse according to a loss. Or the input power of SMF 7 should be increased, so that the nonlinear effect in SMF 7 appears extreme.

In either way, there are limitations in an allowed range of input power, transmission distance and transmission speed in comparison with the case where there is no nonlinear effect in dispersion compensating fiber (DCF) 80. That brings some problems, such as optical signal transmission via the SMF becomes difficult.

Further, even by various kinds of the above described dispersion compensating systems, such as the system for pre-chirping in a transmitter or the system for compressing pulses and shaping waveform of pulses with the non-linear effect in a SMF, there has been a problem that tolerance of input power to SMF 7, in which shaping of waveform may be effectively performed, is narrow, if only one of the above described systems is employed.

When transmitting 1-wave, it is possible to control the output of the optical amplifier so as to be an input power to SMF 7, of which waveform can be shaped.

However, when employing the WDM transmission system, the problems appear as follows;

(1) It is difficult to constantly keep output power of each channel because of dispersion of the optical output power in an optical source or losses in optical devices; and (2) The dispersion is generated in optical outputs between channels, because there is a gain tilting on amplifying characteristic of an optical amplifier, so that a different wavelength makes different amplifying power. Therefore, it is difficult to stably transmit WDM signals on a SMF transmission line.

SUMMARY OF THE INVENTION

Inventors of the present invention has reported investigation of optimization of the above-described dispersion compensation in technical reports, for example, IEICE OCS-94-28 (1994-06) of the institute of electronics, information and communication engineers.

Accordingly, it is an object of the present invention to provide an optical transmission system, of which total dispersion is optimized, with due regard to effectiveness of nonlinear effect of dispersion compensating fiber (DCF) 80, which forms dispersion compensating device 8 according to the investigation of optimization.

Further, it is another object of the present invention to provide an optical transmission system, which can pre-chirp in a transmitter, which increases an allowed range of input power to SMF 7, and provide an optimized value of dispersion compensation in a receiver.

It is other object of the present invention to provide a wavelength multiplexing optical transmission system, which can increase an allowed range of input power to SMF 7 by combining negative pre-chirping in a transmitter and post dispersion compensation on an output side of SMF 7.

A first fundamental structure according to the present invention is as follows:

An optical transmission system for intensively modulates an optical wavelength with a sending signal to be transmitted and optically amplifies a modulated optical signal.

The optical transmission system may comprises a modulating circuit for modulating optical phases or frequencies of the optical wavelength with the sending signal to set a chirping parameter $\alpha$ to $-0.65$ to $-1.3$, and outputting an modulated signal, an optical transmission line having wavelength residual dispersion value of 16 to 21 ps/nm/Km for transmitting the modulated signal, and a dispersion compensating circuit for compensating wavelength dispersion value, of the optical transmission line, which is set to approximately +500 to +1200 ps/nm, when an input optical power is more than $-5$ dBm. Under this condition, it is possible to minimize its penalty.

Further, the second fundamental structure of the wavelength division multiplexing transmission system according to the present invention, is as follows;

An optical wavelength-division multiplexing transmission system for intensively modulating an optical wavelength with a sending signal to be transmitted and optically amplifying a modulated optical signal comprises a modulating circuit provided at a transmitting site for modulating optical phases or frequencies of a sending optical signal, and a dispersion compensating circuit provided at a receiving site for compensating wavelength residual dispersion of an optical transmission line, wherein a combination of a chirping parameter $\alpha$ on the modulating circuit and the wavelength residual dispersion on the dispersion compensating circuit is set to an optimized value for an estimated maximum number of multiplexed wavelengths.

More particularly, in an optical wavelength multiplexing transmission system according to the present invention, the transmission fiber is 1.3 $\mu$m zero-dispersion signal mode fiber, of which dispersion is 16 to 21 ps/nm/km in 1.55 $\mu$m, the chirping parameter $\alpha$ on the above-described modulating means is set to $-0.65$ to $-1.3$. Further, the residual compensation dispersion of the dispersion compensating circuit at the receiving site is set to $600\pm300$ ps/nm.

In this way, it becomes possible to optimize the residual compensation dispersion of all the estimated number of wavelengths in the wavelength multiplexing transmission system by optimizing a combination of a chirping parameter $\alpha$ and a residual compensation dispersion

DESCRIPTION OF THE PREFERRED EMBODIMENT

Preferred embodiments of an optical transmission system according to the present invention will be explained. The optical transmission system, which is an object of the present invention, is not shown in the following diagrams for simplicity. However, the optical transmission system has the same structure as that of the WDM transmission system shown in FIG. 1.

Figure 1:
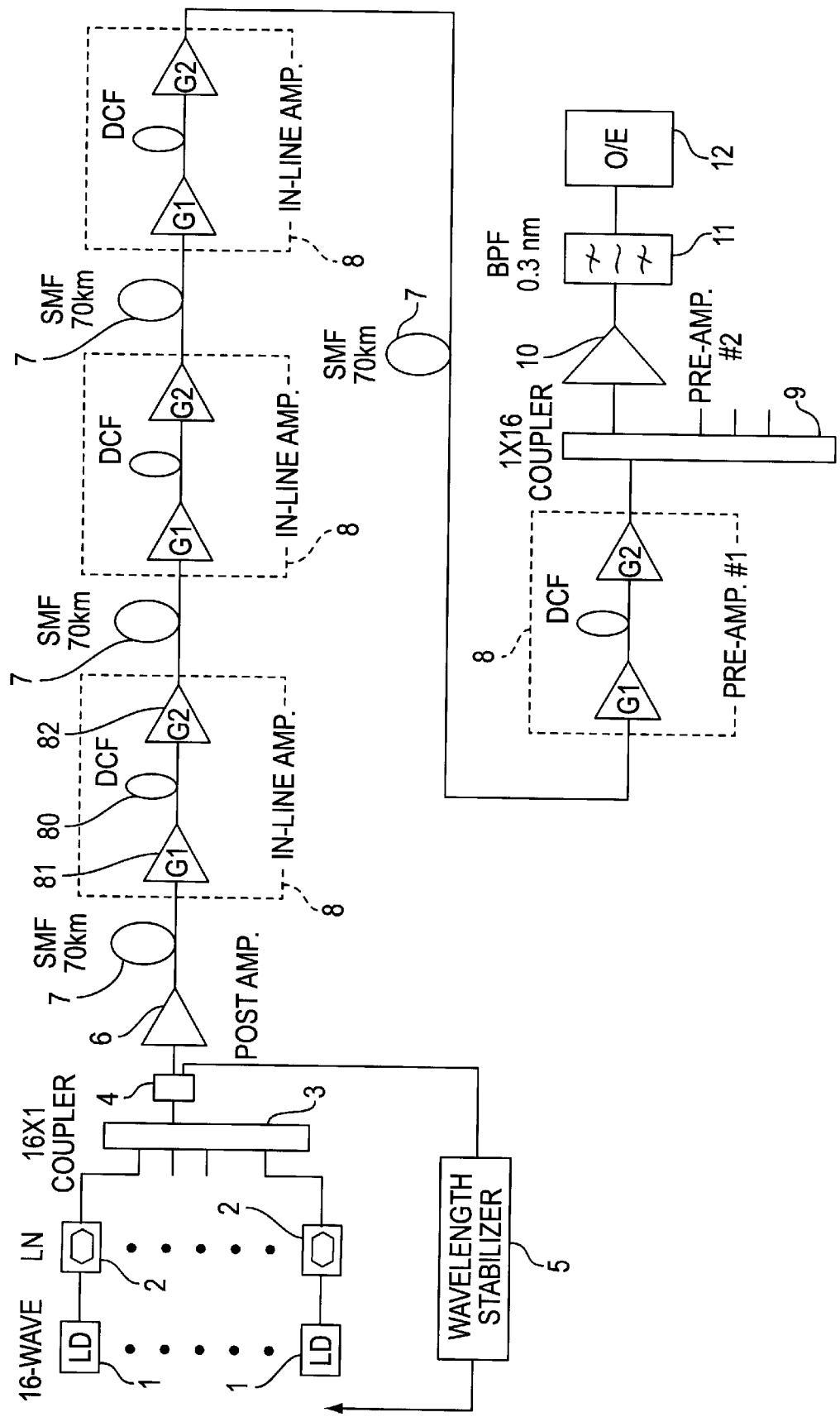
FIG. 1 shows a structure of a general wavelength-division multiplexing transmission system.

Then, when transmitting 1-wave, only one laser diode (LD) 1 is employed in FIG. 1. Additionally, couplers 3 and 8 and bandwidth filter 11 may be omitted in FIG. 1, as already explained.

A feature of the present invention is to optimize a dispersion with due regard to effectiveness brought by nonlinear effect of dispersion compensating fiber (DCF) 80, which forms dispersion compensating device 8. Therefore, the present invention will be now explained by using measured data, which realizes optimization of the dispersion found by inventors of the present invention.

Figure 2:
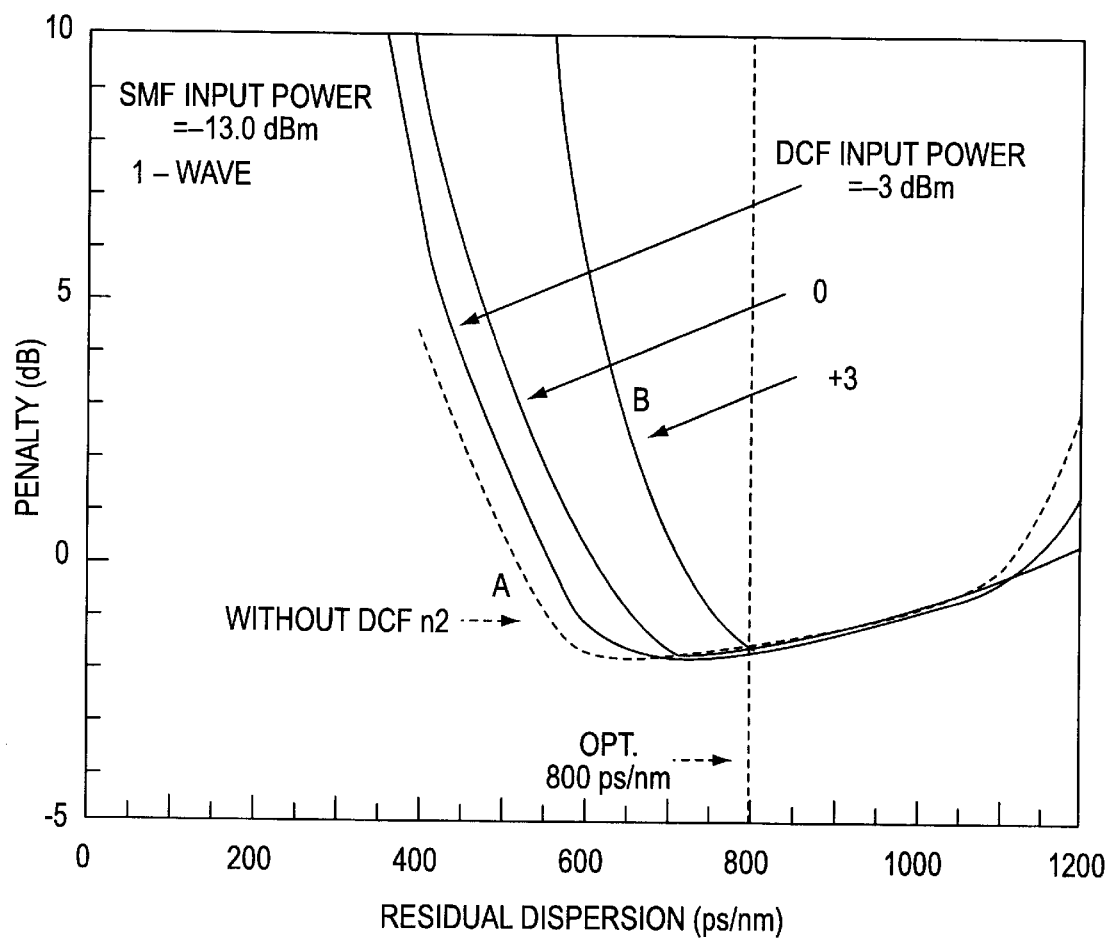
FIG. 2 shows a relationship of optimized values of residual dispersion to DCF input power.

FIG. 2 shows relationship of optimized values of the residual dispersion for DCF input power. More particularly, it shows the case under a condition of 1-wave, transmission speed 10 Gb/s, 300 km transmission distance (3 repeaters, 75 km×4 intervals), and α parameter=−1, which is an index showing pre-chirping direction and amount in a transmitter. Further, the α parameter includes a range of −0.65 to −1.3 in the present embodiments.

The axis of abscissa shows a residual dispersion, and the axis of ordinates shows penalty (loss). The residual dispersion means, for example, if the residual dispersion is +800 ps/nm, the amount of 5100−800=4300 ps/nm is compensated, since all residual dispersion of SMF of 300 km is 17 ps/nm/km×300 km=5100 ps/nm.

The residual chromatic dispersion is equally allocated with four dispersion compensating devices 80 positioned in each repeater and receiver, for example, if the residual dispersion is +800 ps/nm, the residual dispersion of each dispersion compensating device 8 becomes 200 ps/nm. Further, in FIG. 2, SMF input power is +13 dBm, and a dotted line A shows the case where there is no nonlinear effect of DCF.

If there is nonlinear effect of DCF, when DCF input power is increased, the residual dispersion, which becomes the minimum penalty, is increased because of nonlinear effect. If a point of the minimum penalty is an optimized value, when there is no nonlinear effect, shown with the dotted line A, the amount becomes +600 ps/nm, and when there is nonlinear effect and the DCF input power is +3 dBm shown with a line B, the amount becomes +800 ps/nm.

When the DCF input power is set to +3 dBm, and the residual dispersion to +600 ps/nm, the penalty, which is larger than the nonlinear effect of DCF is generated, and that causes fail to transmission. However, when the amount is set to +800 ps/nm, there is no penalty, and it becomes possible to transmit.

In this way, considering nonlinear effect of DCF, the residual dispersion is optimized according to the present invention, there is no effectiveness by nonlinear effect of DCF, so that it becomes possible to make transmission. Further, when the input power to DCF is more than −5 dBm, the amount may be set to approximately +500 to +1200 ps/nm.

Additionally, when the DCF input power is +3 dBm, to obtain the highest receiver sensitivity, from the relationship shown in FIG. 2, according to the present invention, the residual dispersion may be set to approximately +800 ps/nm. Further, when the acceptable amount of the receiving penalty is less than 1 dB, the amount may be set to approximately +650 to +1250 ps/nm.

If there is dispersion in setting of the residual dispersion, the amount may be set to approximately a center, i.e., +950 ps/nm of a setting tolerance having the range of +650 to +1250 ps/nm.

Figure 3:
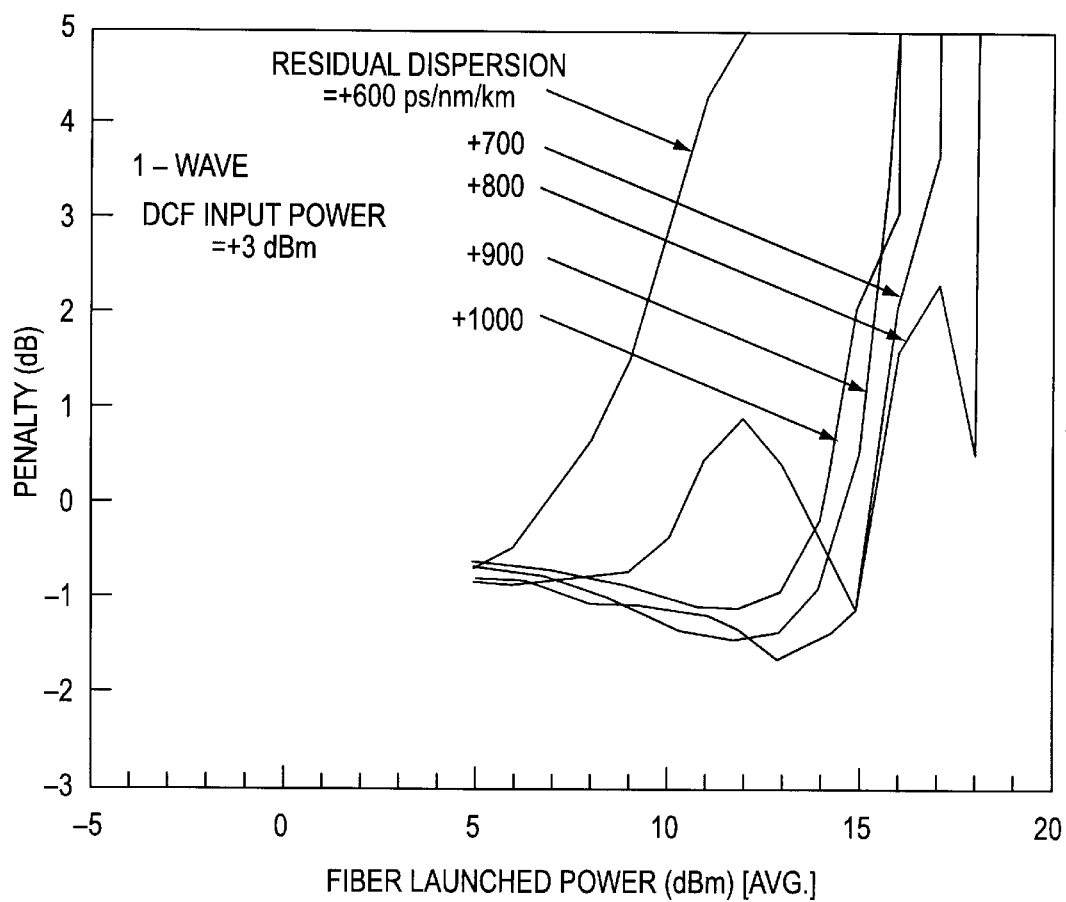
FIG. 3 shows a relationship between SMF input power and a penalty, when transmitting 1-wave.

FIG. 3 shows a relationship between SMF input power and penalty when transmitting 1-wave. It shows the measured values, when DCF input power is +3 dBm, and the SMF input power, which shows in the axis of abscissas, is changed.

If residual dispersion is set to approximately +700 to +1200 ps/nm, there may be no penalty in a wide range of SMF input power, so that it becomes possible to transmit to wavelength. Accordingly, the amount should be set to +700 to +1200 ps/nm in order to transmit with small penalty in a wide range of SMF input power and DCF input power, as understood from FIGS. 2 and 3.

Figure 4:
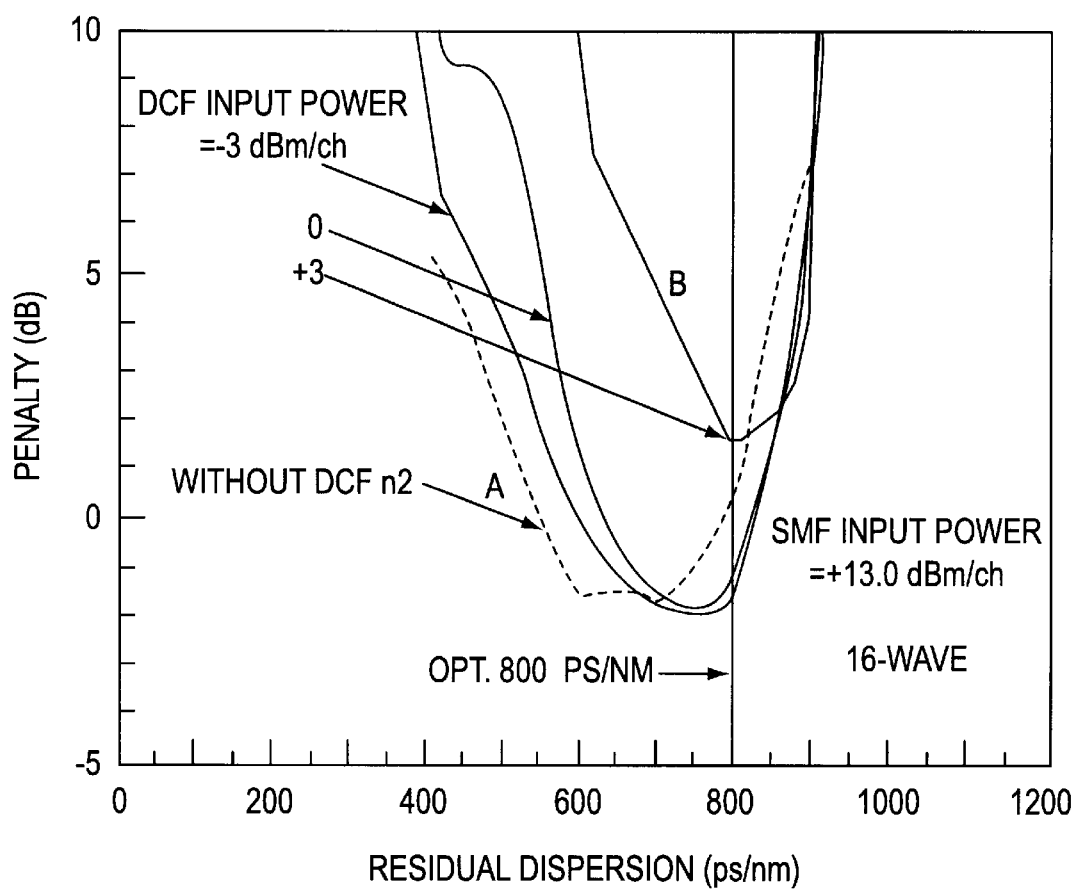
FIG. 4 shows a relationship of optimized values of residual dispersion to DCF input power, when transmitting 16-wave.

FIG. 4 shows a result of consideration in the case of wavelength demultiplexing transmission (WDM). That is, FIG. 4 shows a relationship of optimized values of the residual dispersion to the DCF input power, when transmitting 16-wave.

In FIG. 4, the axis of abscissas shows residual dispersion, and the axis of ordinates shows penalty. More particularly, it shows under the condition of 16-wave, channel interval 0.8 nm, a transmission speed 10 Gb/s (1-wave), 300 km transmission (3 repeaters, 75 km×4), α parameter=−1, in the structure of FIG. 1, when a modulation signal is the same for all channels.

The SMF input power is 13 dBm/ch so as that the efficiency of the cross phase modulation XPM appears extremely. Further, the dotted line A shows the case where there is no nonlinear effect of the dispersion compensating fiber (DCF).

If DCF input power is increased when there is nonlinear effect of DCF, the residual dispersion, which is the minimum penalty because of nonlinear effect of DCF, is increased (refer to the line B shown in FIG. 4).

When a point of the minimum penalty is the optimized value, when there is no nonlinear effect, the amount becomes +600 ps/nm. Further, if the DCF input power is +3 dBm/ch, which is shown with the line B, the amount may be set to approximately +800 ps/nm.

If the residual dispersion is set to +600 ps/nm, when the DCF input power is +3 dBm/ch, the large penalty is generated, and that causes fail to transmit. However, when the amount is set to +800 ps/nm, the small penalty is generated, so that it becomes possible to transmit.

In this way, influence of the cross phase modulation (XPM) is added in comparison with the case of 1-wave transmission. Therefore, there is a little penalty, even if the amount is used as an optimized value. However, when the residual dispersion is optimized, with due regard to nonlinear effect of DCF according to the present invention, the influence of the nonlinear effect of the DCF may be effectively suppressed.

When the input power to the DCF is more than −5 dBm, the amount may be set to approximately +500 to +900 ps/nm. If the DCF input power is 0 dBm/ch, the acceptable value of receiving penalty is less than 1 dB, when the DCF input power is 0 dBm/ch, all channels are set to approximately +600 to +900 ps/nm. Then, compensation may be performed for all channels in a lump or for per plural channels or per channel.

When a channel around the center of wavelength multiplexing signals is set to around the center, that is +750 ps/nm, of the setting tolerance +600 to +900 ps/nm, all channels may be transmitted without any large penalty.

Figure 5:
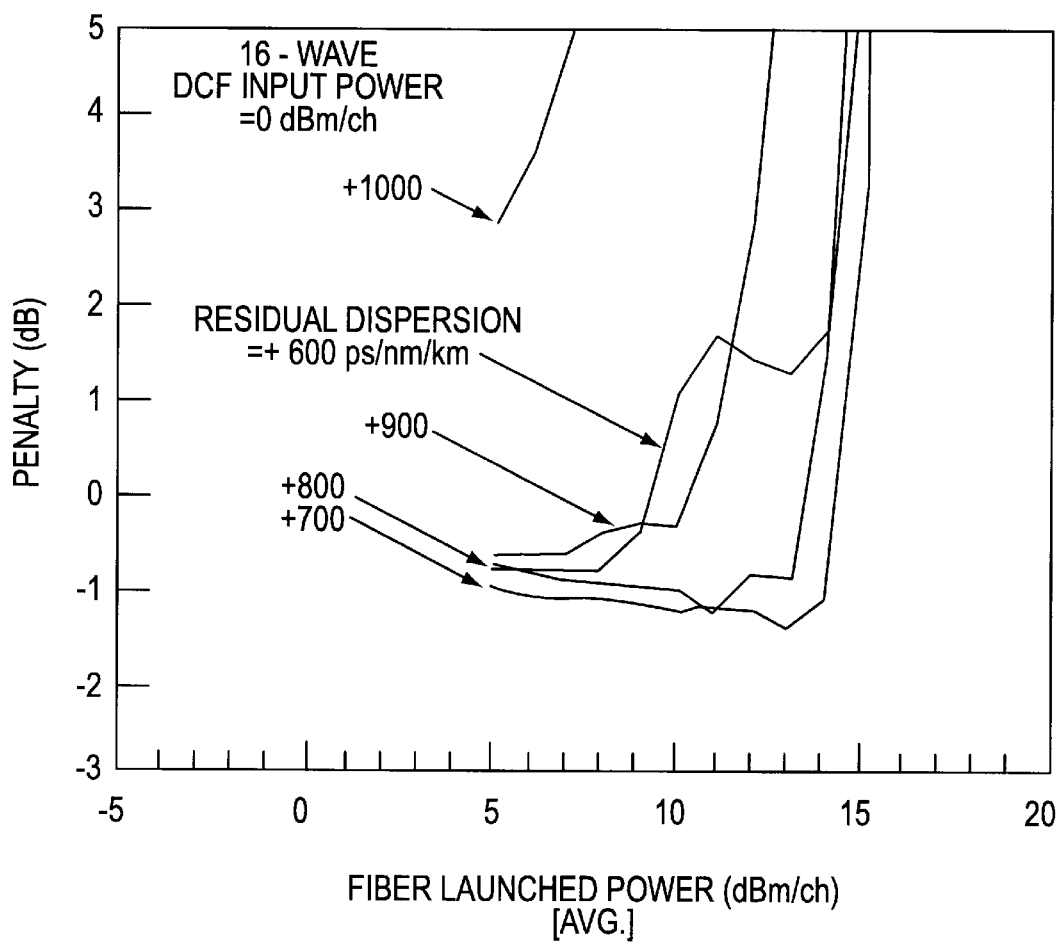
FIG. 5 shows estimated values showing a relationship between SMF input power and penalty.

FIG. 5 shows measured values of SMF input power and penalty. More particularly, it shows a result of the consideration when the DCF input power is 0 dBm/ch, and the SMF input power is changed.

It is apparent from FIG. 5 that it becomes possible to transmit with no penalty in a wide range of SMF input power, when the residual dispersion is set to a range from +700 to +900 ps/nm. Accordingly, the amount should be set to a range from +700 to +900 ps/nm in order to transmit with small penalty in a wide range of SMF input power, or a range of DCF input power, from the relationship shown in FIGS. 4 and 5 according to the present invention.

Figure 6:
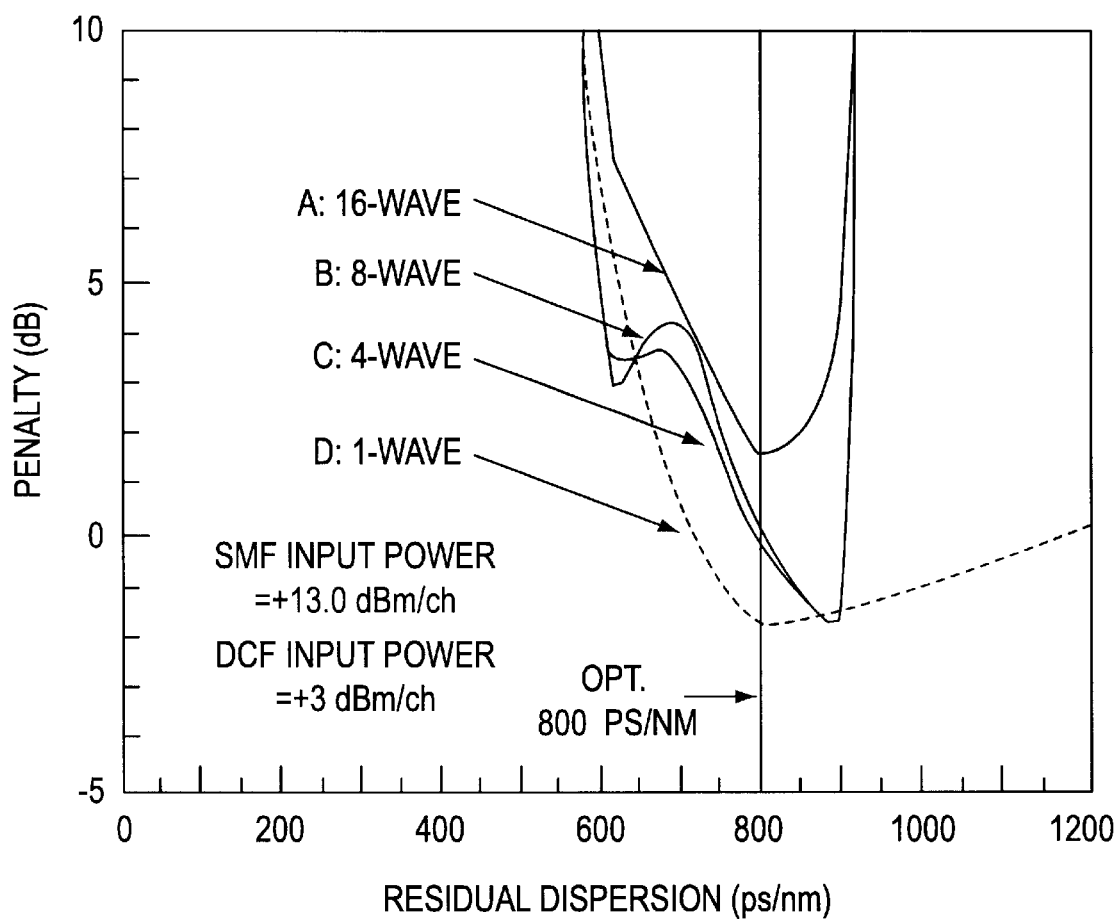
FIG. 6 shows a relationship of optimized values of the residual dispersion for each wavelength number.

FIG. 6 shows a relationship of the optimized value of residual dispersion for each number of wavelengths. More particularly, it shows a result of consideration in the case where the number of wavelengths is 1 to 16-wave. The axis of abscissas shows a residual dispersion, and the axis of ordinates shows penalty. It can be understood from FIG. 6 that influence due to cross phase modulation (XPM) is changed by the number of wavelength, and a residual dispersion, which is the minimum penalty, be changed.

When transmitting 4-wave, shown with C, or 8-wave, shown with B, the amount near +880 ps/nm becomes the minimum penalty. When transmitting 16-wave, which is shown in A, the amount near +800 ps/nm is the minimum penalty. Accordingly, it is preferable to set the residual dispersion corresponding to the number of wavelengths according to the present invention.

When the number of wavelengths will be changed because of expansion of transmittance capacity in the future, the value without large penalty with the estimated maximum number of wavelengths or all numbers of wavelengths. If 16-wave is the number of maximum wavelength, the amount near +800 ps/nm becomes most suitable value.

Waveform deterioration in the case of wavelength-division multiplexing transmission is caused due to adding cross phase modulation (XPM) to self-phase modulation (SPM) effect. XPM depends on the correlative relation of the modulated pattern of each channel.

Large influence of XPM is brought in the case where the signals for each channel is emitted or non-emitted simultaneously around an exit of the transmission fiber, of which optical power is large, i.e., the case where the same modulation pattern is launched to an optical transmission line.

Figure 7:
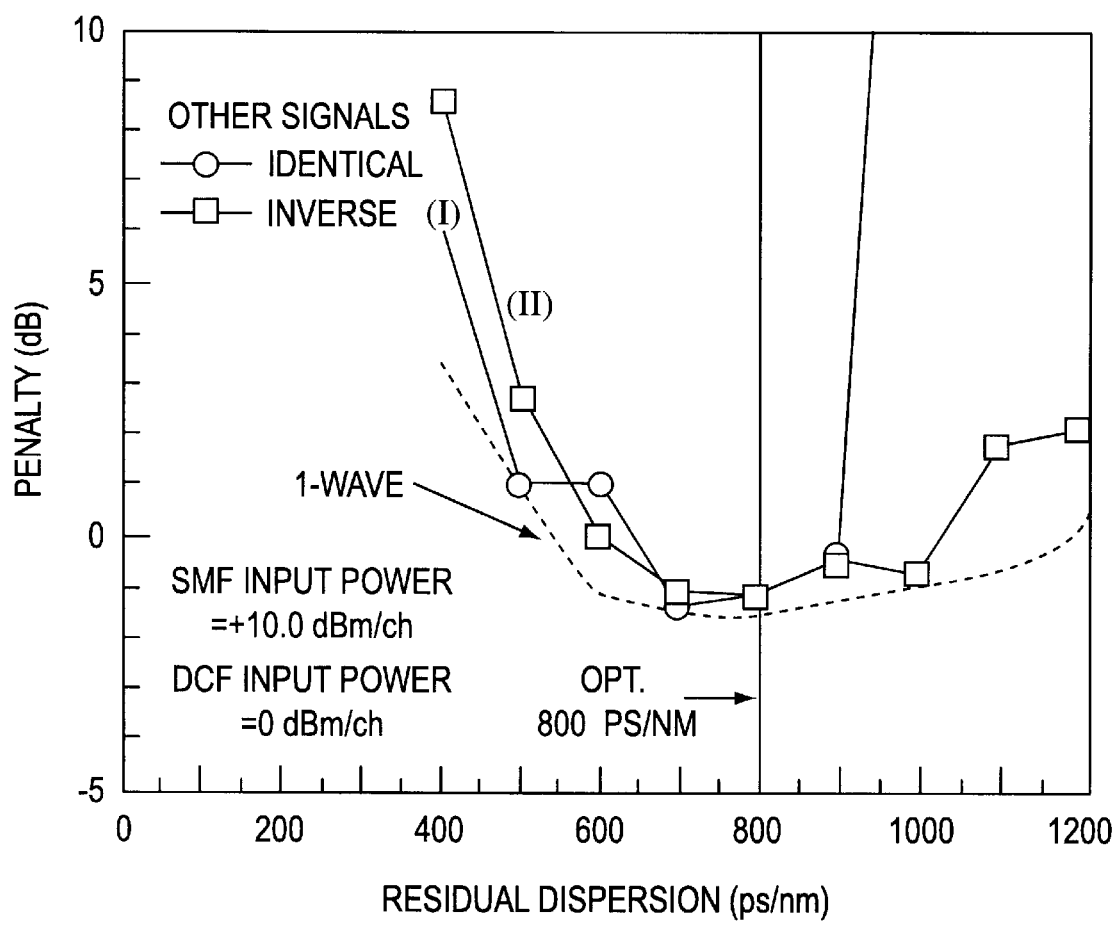
FIG. 7 shows a dependency of modulated patterns of the optimized value of the residual dispersion.

Accordingly, the amount in the case where channels are simultaneously modulated may be considered to decide the suitable residual dispersion. FIG. 7 shows dependency of the optimized values of the residual dispersion on a modulated pattern. More particularly, it shows a result of consideration of the modulated pattern dependency when transmitting 16-wave.

As the influence of the cross phase modulation (XPM) is frequently appeared. The SMF input pattern is +10 dBm/ch, and the DCF input power is high as much as 0 dBm/ch.

There are two patterns of (I) the case where each channel is the same and (II) the case where channels except a receiving channel are reversed. In the channels except the receiving channels, the reversed modulated pattern is the case where the influence of XPM is reduced.

It is apparent from FIG. 7 that it is easy to obtain the suitable values because the tolerance is small, in the case where each channel is the same (I). Further, as the same value can be obtained in the case where the channels are random (II), it is possible to optimize the values. Further, it is also possible to optimize the values in all of the cases of a same channel, a reversed channel, and a random channel.

The present embodiment, in which an acceptable range of the SMF input power is increased by combining pre-chirping in the transmitter and the dispersion compensation in the output side of SMF, will be explained as follows.

Figure 8:
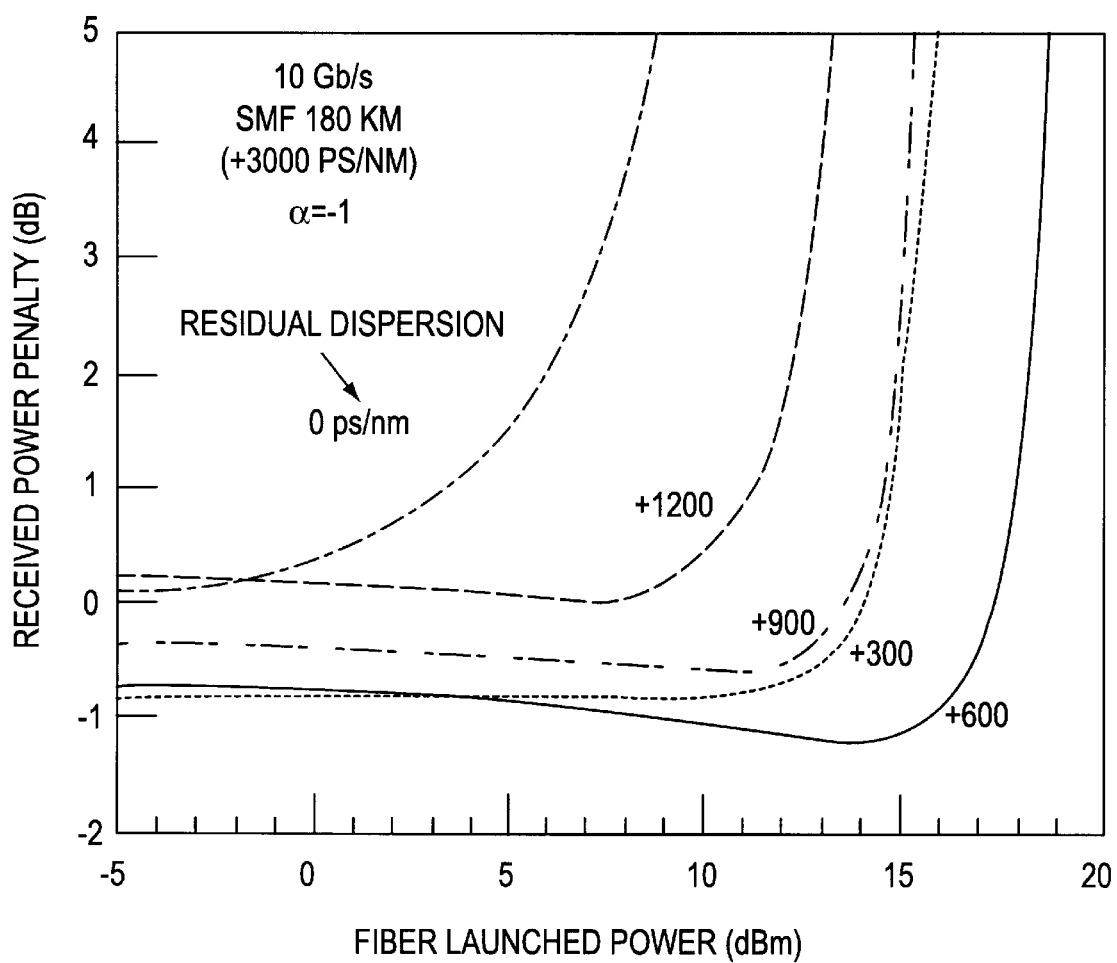
FIG. 8 shows a relationship of SMF input power and the received penalty, when combining negative pre-chirping and post dispersion compensation in a receiver side.

FIG. 8 shows a relationship between SMF input power, which is shown in the axis of abscissas, and received power penalty, which is shown in the ordinates, in the case of combining pre-chirping in the transmitter and the dispersion compensation in the output side of SMF.

More particularly, it shows the case where the α parameter, which is an index showing direction and amount of pre-chirping in the transmitter, is set to −1, when 10 Gb/s, 1-wave, 180 km repeaterless transmission is performed by SMF 7.

It is apparent from FIG. 8 that an allowed values of SMF input power, which is very wide, can be obtained in the case where the residual dispersion is +600 ps/nm, that means, total dispersion of the SMF 7 of 180 km is 18 ps/nm/km×180 km=3240 ps/nm, and the residual dispersion is +600 ps/nm, that why 2640 ps/nm/km can be compensated.

In this way, according to the present invention, it is easy to understand that it is an effective dispersion compensating method in the WDM transmission system to combine two of the above-described methods, i.e., negative pre-chirping and post dispersion compensation.

However, the above-described suitable values of two parameters, when transmitting 1-wave is different from that when transmitting WDM employing a plurality of wavelengths. Further, according to the number of wavelengths, which are multiplied, the suitable values of these parameters become different. This is because the cross phase modulation effect is also influenced in addition to the self-phase modulation effect, which is nonlinear effect in the case of 1-wave transmission, when transmitting WDM.

Figure 9:
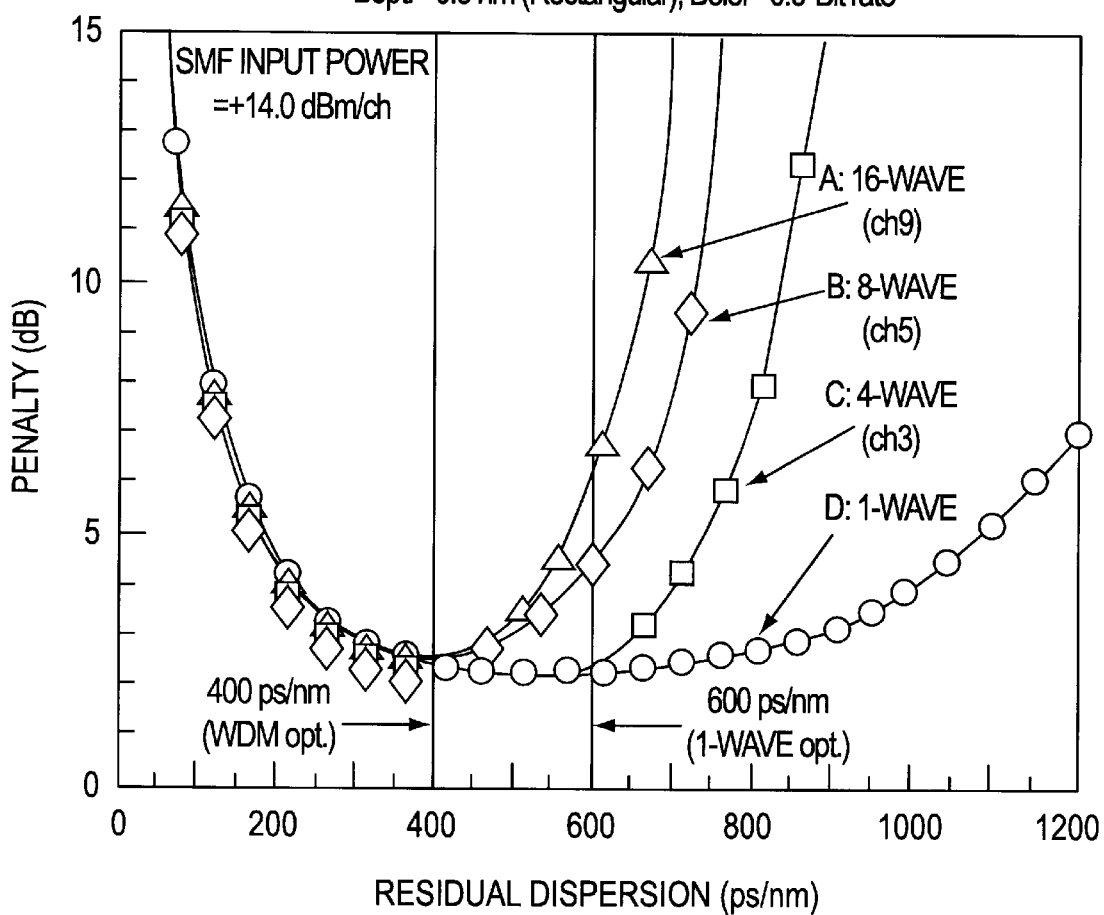
FIG. 9 shows a relationship of optimized values of the residual dispersion in the embodiment of repeaterless transmission system.

FIG. 9 shows a relationship between optimized values of the residual dispersion in a repeaterless transmission system. More particularly, it shows suitable residual dispersion according to the present invention, in the case of repeaterless WDM transmission, in comparison with the prior art.

When transmitting 1-wave, +600 ps/nm/km is the preferable residual dispersion, as shown in FIG. 8. However, in the case of WDM transmission, another suitable residual dispersion becomes preferable.

That is, FIG. 9 shows a relationship between the number of multiplexed wavelengths found by the inventors of the present invention, which is shown in the axis of the abscissas, and penalty, which is shown in the axis of ordinates. It becomes apparent from FIG. 9 that when the residual dispersion giving the penalty is less than a fixed value, for example, 1 dB, a tolerance of the residual dispersion is narrower as the multiplexed wavelength number is larger.

Accordingly, if the dispersion compensating is set in accordance with the suitable residual dispersion in the case of the maximum number of the transmission wavelengths shown in FIG. 9, it is possible to transmit with no penalty when transmitting the number of wavelengths, which is less than the maximum number, or 1-wave.

Figure 10:
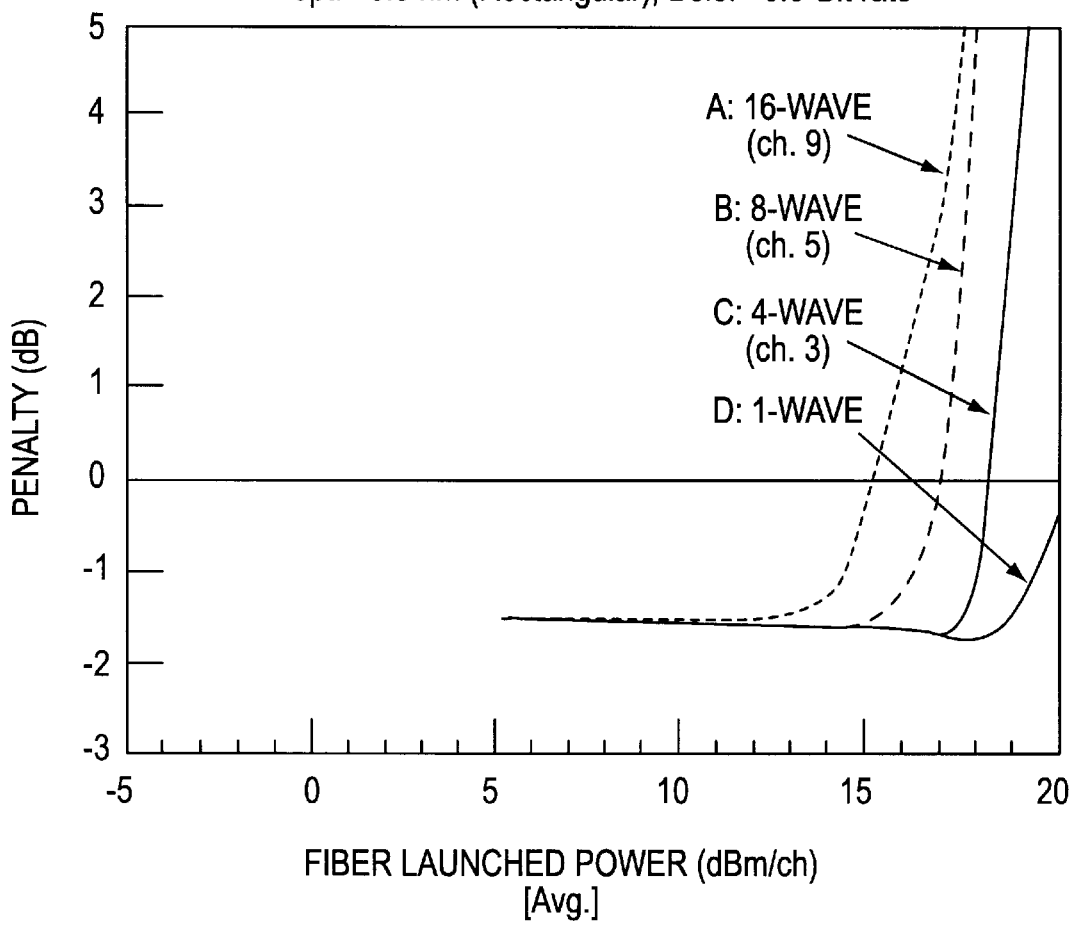
FIG. 10 shows a relationship between SMF input power and the received penalty, when optimizing residual-dispersion and 16-wave.

In the case of FIG. 9, when the maximum number of wavelengths is 16 (A), +400 ps/nm is the suitable residual dispersion. The tolerances of the residual dispersion of 8-wave (B) and 4-wave (C) are wider than that of 16-wave. Therefore, when the value is optimized in the case of 16-wave (A), it is possible to transmit with no receiving penalty, in either case of transmitting 8-wave or 4-wave. FIG. 10 shows a relationship between a SMF input power and a receiving penalty, when optimizing with the residual dispersion and 16-wave. More particularly, it shows a relationship between the SMF input power, which is shown in the axis of abscissas, and the receiving penalty, which is shown in the axis of ordinates, when the residual dispersion is set to +400 ps/nm, which is the suitable value, when transmitting 16-wave (refer to A shown in FIG. 9).

In the case of 16-wave (A), deterioration of the receiving penalty is generated from the extent of 13 dBm/ch. Further, when transmitting 1-wave (D), deterioration begins from the extent of +18 dBm.

Figure 11:
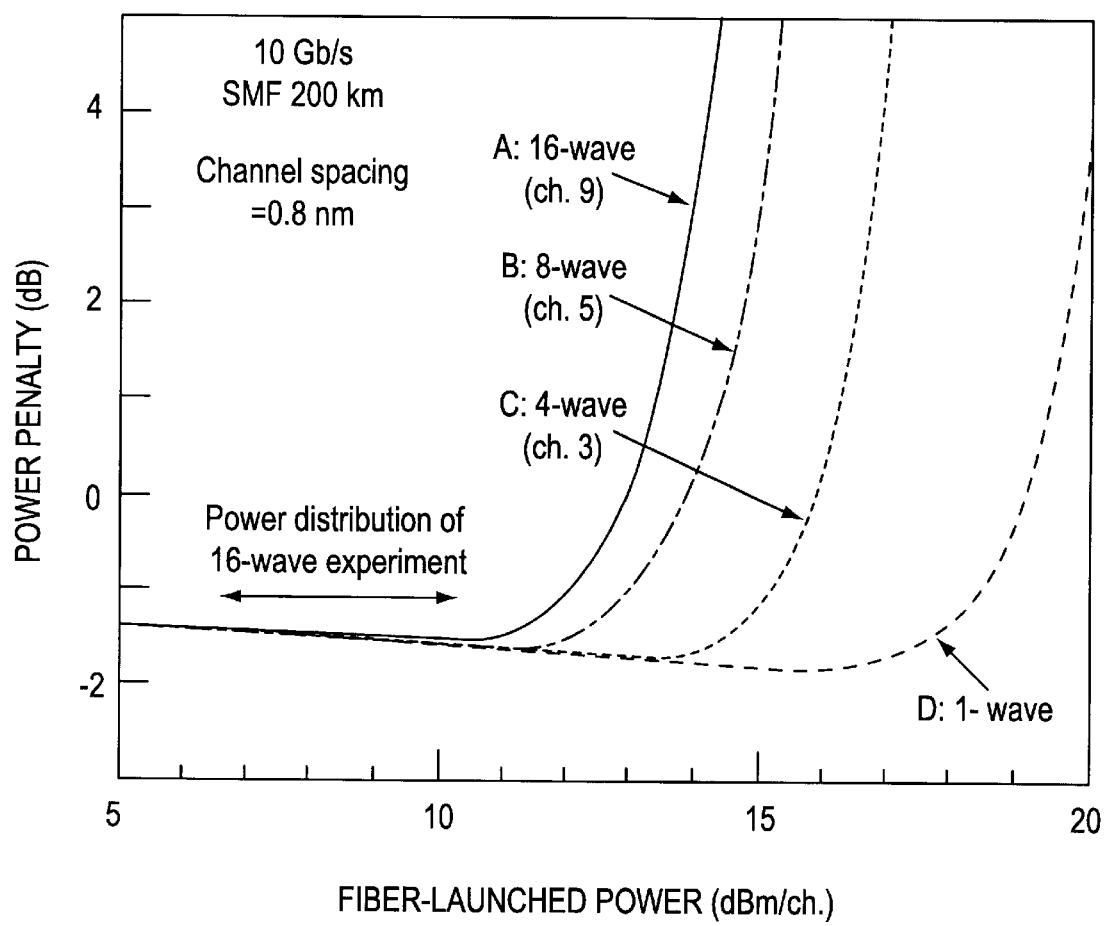
FIG. 11 shows a relationship between SMF input power and the received penalty, when optimizing residual-dispersion and 1-wave.

FIG. 11 shows a relationship between the SMF input power and the receiving penalty when optimizing with the residual dispersion and 1-wave. FIG. 11 shows the relationship between the SMF input power, which is shown in the axis of abscissas, and the receiving penalty, which is shown in the axis of ordinates, in the case of +600 ps/nm (refer to FIG. 8), which is a suitable residual dispersion of 1-wave for comparison.

In this case, when transmitting 16-wave (A), deterioration of the receiving penalty begins from about +10 dBm/ch, and the deterioration begins from the power, which is about 3 dB less with compared to the case of +400 ps/nm, which is optimized with 16-wave.

The upper limitation of the SMF input power in either case of 8-wave (B) or 4-wave (C) becomes larger than that when optimizing with 16-wave (A) (refer to FIG. 10). Therefore, it is apparent to improve the problems in the prior art according to the present invention. The tolerance of the residual dispersion is wider when transmitting 1-wave, so that deterioration begins from the approximately same input power as shown in FIGS. 10 and 11.

Figure 12:
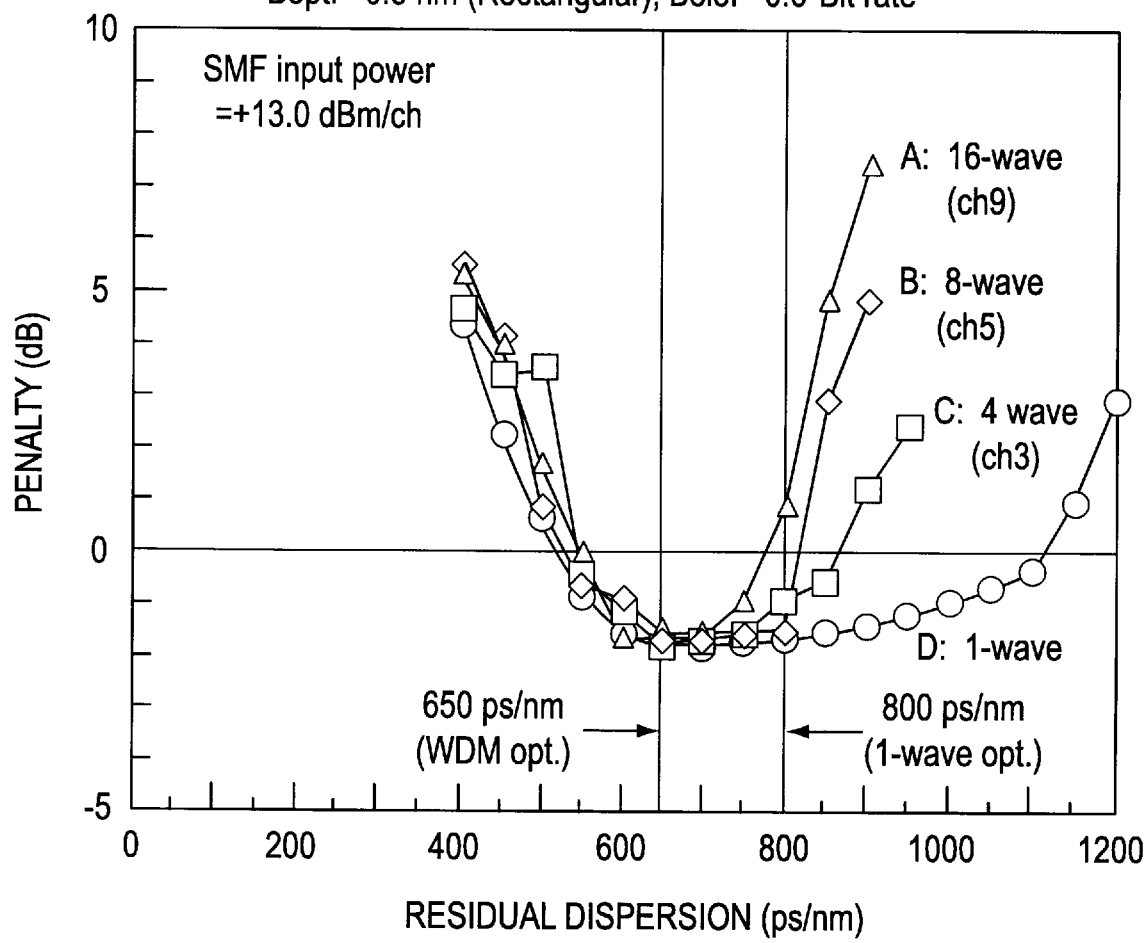
FIG. 12 shows a relationship between the residual dispersion and received penalty, when transmitting with multi-repeaters employing optical amplifiers.

FIG. 12 shows measured values between the residual dispersion, which is shown in the axis of abscissas, and receiving penalty, which is shown in the axis of ordinates, when transmitting with multi-repeaters employing an optical amplifier. More particularly, it shows a result of measurement when transmitting signals of 1 to 16-wave, within a distance of 300 km with the repeater interval of 75 km with wavelength interval 0.8 nm.

The pre-chirping parameter $\alpha$ is −1, and the residual dispersion, which is shown in the axis of abscissas, is equally allocated to dispersion compensating devices each positioned in each repeater and the receiver. For example, when the residual dispersion is +800 ps/nm, the residual dispersion in three repeaters and a receiver is respectively 200 ps/nm.

In this embodiment, the suitable residual dispersion, when transmitting 1-wave (D) is near +800 ps/nm. Further, the suitable residual dispersion, when transmitting 16-wave (A) is +650 ps/nm. If the residual dispersion is set to +650 ps/nm, it becomes possible to keep the minimum receiving penalty, even if the number of wavelengths is smaller.

As described above, it is possible to keep the approximately minimum receiving penalty, even if transmitting wavelength number, which is less than the maximum number of wavelengths, by employing the present system, in which the residual dispersion is optimized with the estimated maximum number of wavelengths. Further, it is apparent that this condition may be applied to every cases, regardless of a repeaterless transmission system or optical-amplifying multi-repeater transmission system.

Waveform deterioration in the case of wavelength-division multiplexing transmission is mainly generated by nonlinear effect in an optical fiber. In the case of wavelength-division multiplexing transmission, effectiveness of cross phase modulation (XPM) is also influenced in addition to self-phase modulation (SPM), which is nonlinear effect when transmitting 1-wave.

It is considered that the cross phase modulation (XPM) depends on optical power and the modulated pattern of each channel, as described above. However, it is considered that there is the most large influence in the case where signals of channels are simultaneously outputted or not outputted at an exit of an optical transmission line, of which optical power is the largest, i.e., the case where a modulated pattern is launched to the transmission line when the modulated pattern is the same.

Figure 13:
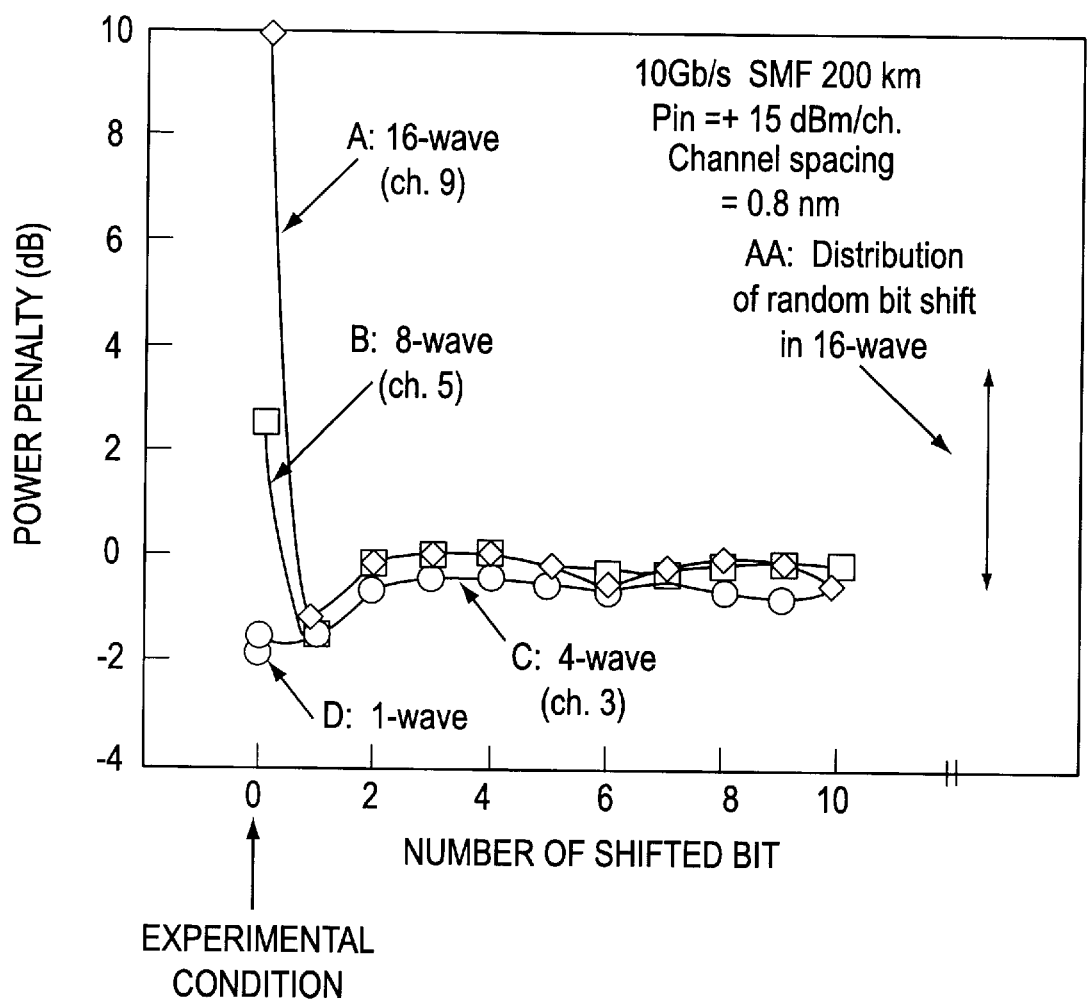
FIG. 13 shows a relationship between the modulated bit sequence and the received penalty.

Therefore, in the wavelength-division multiplexing transmission system of the present invention, when deciding the above-described suitable residual dispersion, the case where channels are simultaneously modulated may be considered. FIG. 13 shows a relationship between modulated bit sequences and receiving penalty, i.e., a result of consideration of dependency on the modulated patterns between channels.

FIG. 13 shows an example of measurement of power penalty, which is shown in the axis of ordinates, when shifting the modulated bit sequence of the remaining all channels for the receiving channel, i.e., a central channel, when transmitting 4 to 16-wave. As the influence of the cross phase modulation (XPM) is extremely shown, the optical power becomes to +15 dBm/ch.

FIG. 13 also shows the measured value, in the case of randomly shifting the bit sequence when transmitting 16-wave (A). The axis of abscissas shows number of shifted bits, and 0 shows the case where the signal sequences for all channels are coincided. When transmitting 4-wave (C), there is small influence by XPM and small variation of penalty. The influence by XPM appears when transmitting 8-wave (B) and 16-wave (A).

As apparent from FIG. 13, it is the worst condition, when signal sequences of all channels are coincided, i.e., the number of shifted bits shown in the axis of the abscissas is 0. When transmitting 16-wave (A), penalty of approximately 10 dB is generated. It can be understood that the penalty is converged to a fixed value, when shifting several time slot.

However, in the case where randomly shifting the bit sequence when transmitting 16-wave (AA), power penalty is dispersed between −1 dB to +4 dB. Therefore, the power penalty depends on the bit sequence.

In this way, although the power penalty depends on the bit sequence, the inventors of the present invention found from the measurement that it is the worst case when the modulated pattern is the same. Accordingly, when designing to the nonlinear effect of the WDM transmission system, it should be considered that each channel be modulated with the same signal.

In an optical transmission system, a repeater interval is not pre-determined, and the repeater interval is changed in a shorter range than that of the maximum repeater transmission distance. Therefore, the dispersion on each repeater or the residual dispersion is required to optimize according to the repeater distance.

Therefore, it is preferable to have a structure in the dispersion compensating device so as to obtain the desired dispersion by combining some units, each of which dispersion is different. It is convenient to compensate all dispersion in a unit, of which compensating amount changed according to geometric progression, is reduced.

As one example, a system, of which total length of the transmission line is the maximum 280 km, having three repeaters per the maximum 75 km will be considered. It is supposed that the residual dispersion per each interval is set to be within ±100 ps/nm from the suitable residual dispersion. If the dispersion value of the transmission fiber is 18 ps/nm/km, it is possible to set by combining the dispersion compensating unit as follows.

That is, the estimated dispersion acceptable difference per an interval (all width) is the minimum dispersion compensating amount. It becomes the best condition by preparing the dispersion compensating fiber with geometric progression of the ratio 2, from the view point of the minimization of the number of dispersion compensating device.

The following table shows a relationship between a transmission interval and the residual dispersion of the dispersion compensating device from the view point of the above-described explanation.

TABLE

| DISPERSION VALUE | TRANSMISSION DISTANCE | DCF UNIT COMBINATION |
|---|---|---|
| 0 to 100 | 0 to 5.6 | nothing |
| 100 to 300 | 5.6 to 16.7 | −200 ps |
| 300 to 500 | 16.7 to 27.8 | −400 ps |
| 500 to 700 | 27.8 to 38.9 | −200 ps ± 200 ps |
| 700 to 900 | 38.9 to 50.0 | −800 ps |
| 900 to 1100 | 50.0 to 61.1 | −800 ps ± 200 ps |
| 1100 to 1200 | 61.1 to 70.0 | −800 ps ± 400 ps |
| 1200 to 1350 | 70.0 to 75.0 | −800 ps ± 400 ps ± 200 ps |

As described according to the embodiments, it becomes possible to suppress influence due to nonlinear effect of the dispersion compensating devices and the stable longest distance high-capacity transmission system may be employed.

Further, in the wavelength-division multiplexing transmission system, it is also possible to optimize the residual dispersion of all the estimated wavelength numbers, and minimize the variety of the dispersion compensating unit.

What is claimed is:

1. An optical transmission system for intensively modulating an optical wavelength with a sending signal to be transmitted and optically amplifying a modulated optical signal comprising:
a modulating circuit for modulating optical phases or frequencies of the optical wavelength with the sending signal to set a chirping parameter α of −0.65 to −1.3, and outputting a modulated signal;
an optical transmission line having a wavelength dispersion value of 16 to 21 ps/nm/Km for transmitting the modulated signal; and
a dispersion compensating fiber for compensating the wavelength dispersion of the optical transmission line to have a residual dispersion of approximately +500 to +1200 ps/nm when an input optical power to the dispersion compensating fiber is more than −5 dBm.

2. The optical transmission system according to claim 1, wherein the residual dispersion is set to a range of +700 to +1200 ps/nm when the input optical power to the dispersion compensating fiber is from 0 to +15 dBm.

3. The optical transmission system according to claim 2, wherein the residual dispersion is set to approximately +700, +700 or +800 ps/nm, respectively when the input optical power to the dispersion compensating fiber is set to approximately −3, 0 or +3 dBm.

4. The optical transmission system according to claim 2, wherein the residual dispersion is set in a range of +500 to +1200, +550 to +1250, or +650 to +1250 ps/nm, respectively when the input optical power to the dispersion compensating fiber is set to −3, 0 or +3 dBm.

5. The optical transmission system according to claim 4, wherein the dispersion compensating fiber is set to approximately +850, +900, or +950 ps/nm, respectively corresponding to the range of +500 to +1200, +550 to +1250, or +650 to +1250 ps/nm.

6. The optical transmission system according to claim 1, wherein the residual dispersion is set to approximately +700, +700 or +800 ps/nm respectively when the input optical power to the dispersion compensating fiber is set to approximately −3, 0 or +3 dBm.

7. The optical transmission system according to claim 1, wherein the residual dispersion is set in a range of +500 to +1200, +550 to +1250, or +650 to +1250 ps/nm, respectively when the input optical power to the dispersion compensating fiber is set to approximately −3, 0 or +3 dBm.

8. The optical transmission system according to claim 7, wherein the dispersion compensating fiber is set to approximately +850, +900, or +950 ps/nm, respectively corresponding to the range of +500 to +1200, +550 to +1250 or +650 to +1250 ps/nm.

9. An optical wavelength-division multiplexing transmission system for intensively modulating plural optical wavelengths with respective sending signals to be transmitted and optically amplifying modulated optical signals comprising:
a modulating circuit for modulating optical phases or frequencies of the plural optical wavelengths with the respective sending signals to set a chirping parameter α of −0.65 to −1.3, and outputting the modulated signals;
an optical transmission line having a wavelength dispersion value of 16 to 21 ps/nm/Km for transmitting the modulated signals; and
a dispersion compensating fiber for compensating the wavelength dispersion value, of the optical transmission line, to have a residual dispersion of approximately +500 to +900 ps/nm, when an input optical power to the dispersion compensating fiber is more than −5 dBm/ch.

10. The optical wavelength-division multiplexing transmission system according to claim 9, wherein the residual dispersion amount is set within a range of +700 to +900 ps/nm when optical input power to the dispersion compensating fiber is from 0 to +15 dBm/ch.

11. The optical wavelength-division multiplexing transmission system according to claim 10, wherein the wavelength residual dispersion is set to approximately +800 ps/nm, when the number of wavelengths of the sending signal is set to any one of 1 to 16.

12. The optical wavelength-division multiplexing transmission system according to claim 9, wherein the wavelength residual dispersion is set to approximately +880, +880, or +800 ps/nm, respectively when the number of wavelengths of the sending signals is 4, 8, or 16.

13. The optical wavelength-division multiplexing transmission system according to claim 9, wherein the wavelength residual dispersion is set to approximately +800 ps/nm, when the number of wavelengths of the sending signal is set to any one of 1 to 16.

14. An optical wavelength-division multiplexing transmission system for intensively modulating an optical wavelength with a sending signal to be transmitted and optically amplifying a modulated optical signal comprising:

an optical transmission line;

a modulating circuit provided at a transmitting site of the optical transmission line for modulating optical phases or frequencies of a sending optical signal to set a chirping parameter $\alpha$; and a dispersion compensating fiber provided at a receiving site of the optical transmission line for compensating wavelength residual dispersion of the optical transmission line to have a residual dispersion amount, wherein a combination of the chirping parameter $\alpha$ on the modulating circuit and the residual dispersion amount on the dispersion compensating fiber is set to an optimized value for an estimated maximum number of multiplexed wavelengths.

15. The optical wavelength-division multiplexing transmission system according to claim 14, wherein said optimized value is set by transmitting a same signal for each channel.

16. The optical wavelength-division multiplexing transmission system according to claim 14, wherein the optical transmission line is an optical fiber having a wavelength dispersion value of 16 to 21 ps/nm/km, the chirping parameter $\alpha$ on the modulating circuit is set to −0.65 to −1.3, and the residual dispersion of the dispersion compensating fiber is set to 600±300 ps/nm.

17. The optical wavelength-division multiplexing transmission system according to claim 14, wherein the optical transmission line is an optical fiber having a wavelength dispersion value of 16 to 21 ps/nm/km, the chirping parameter $\alpha$ on the modulating circuit is set to −0.65 to −1.3, and the residual dispersion amount of the dispersion compensating fiber is set to 400±100 ps/nm.

18. An optical transmission system for intensively modulating an optical wavelength with sending signal and sending a modulated optical signal to a receiving site, comprising:

a modulating circuit for modulating optical phases or frequencies of the optical wavelength with the sending signal to set a chirping parameter $\alpha$ of −0.65 to −1.3, and outputting a modulated signal;

an optical transmission line having a wavelength dispersion value of 16 to 21 ps/nm/Km for transmitting the modulated signal; and a plurality of amplifying repeaters provided on the optical transmission line, each of the plurality of amplifying repeaters including a dispersion compensating fiber for compensating the wavelength dispersion of the optical transmission line to have a residual dispersion amount set in a range of +500 to +1200, when an input optical power to a respective dispersion compensating fiber is set to approximately −3, 0 or +3 dBm, wherein a suitable dispersion value for the optical transmission line is obtained by selecting combination of residual dispersion amounts of the dispersion compensating fibers of the plurality of first amplifying repeaters.

19. The optical transmission system according to claim 18, wherein a maximum residual dispersion allowed for each repeating interval between the amplifying repeaters is employed as a minimum value at a dispersion compensating fiber, and then dispersion values are given with an interval of ratio 2, so that the combination of residual dispersion amounts for the suitable dispersion value is obtained.

20. The optical transmission system according to claim 18, wherein incomplete amount of the dispersion compensation by the dispersion compensating fibers provided in the plurality of amplifying repeaters is compensated by another dispersion compensating fiber provided at a transmitting site or a receiving site.

* * * * *